(12) United States Patent
Leum

(10) Patent No.: US 9,688,493 B2
(45) Date of Patent: Jun. 27, 2017

(54) MOBILE LOADING DOCK WITH SIDE EXTENSIONS

(71) Applicant: Grant Leum, Excelsior, MN (US)

(72) Inventor: Grant Leum, Excelsior, MN (US)

( * ) Notice: Subject to any disclaimer, the term of this patent is extended or adjusted under 35 U.S.C. 154(b) by 60 days.

(21) Appl. No.: 14/936,269

(22) Filed: Nov. 9, 2015

(65) Prior Publication Data

US 2017/0129723 A1    May 11, 2017

(51) Int. Cl.
| | |
|---|---|
| *B65G 69/00* | (2006.01) |
| *B65G 69/28* | (2006.01) |
| *B65G 69/30* | (2006.01) |
| *B60P 1/00* | (2006.01) |

(52) U.S. Cl.
CPC .......... *B65G 69/287* (2013.01); *B65G 69/30* (2013.01); *B60P 1/00* (2013.01)

(58) Field of Classification Search
CPC .......... B65G 69/30; B65G 69/287; B60P 1/00
USPC ........................................... 14/69.5; 114/362
See application file for complete search history.

(56) References Cited

U.S. PATENT DOCUMENTS

| | | | |
|---|---|---|---|
| 2,547,956 | A | 4/1951 | McDonald |
| 2,739,325 | A | 3/1956 | Grace |
| 2,924,427 | A | 2/1960 | Larson |
| 3,024,870 | A | 3/1962 | Kramcsak et al. |
| 3,061,125 | A | 10/1962 | Noland |
| 3,548,433 | A | 12/1970 | Miles et al. |
| 3,635,492 | A | 1/1972 | Mauldin |
| 3,802,018 | A | 4/1974 | Miles et al. |
| 4,201,157 | A | 5/1980 | Lambert |
| 4,270,630 | A | 6/1981 | Karkau |
| 4,453,282 | A | 6/1984 | Larsen |
| 4,624,446 | A | 11/1986 | Gould |
| 4,765,792 | A | 8/1988 | Cherry et al. |
| 5,065,468 | A | 11/1991 | Sherrod |
| 5,306,112 | A | 4/1994 | Kielinski |
| 5,311,628 | A | 5/1994 | Springer et al. |
| 5,445,352 | A | 8/1995 | Long |
| 5,845,356 | A | 12/1998 | Kielinski |

(Continued)

FOREIGN PATENT DOCUMENTS

| | | |
|---|---|---|
| CN | 203 729 856 | 7/2014 |
| DE | 19 46 083 | 3/1971 |

(Continued)

OTHER PUBLICATIONS

English language machine translation of Abstract, CN 203 729 856, Lu, Jul. 23, 2014.

(Continued)

*Primary Examiner* — Raymond W Addie
(74) *Attorney, Agent, or Firm* — Jansson Munger McKinley & Kirby Ltd.

(57) ABSTRACT

A mobile loading ramp including a main member having a substantially flat upper ramp surface extending from an upper end for abutting the bed of a truck to a lower ground-adjacent end and including opposed lateral edges. The main member having a pair of removable side extension-barrier members each including a bracket removably secured with respect to one of the opposed lateral edges and having an upper flat surface substantially coplanar with and widening the flat upper ramp surface and an upwardly-extending barrier portion offset from the upper ramp surface.

19 Claims, 5 Drawing Sheets

(56) References Cited

U.S. PATENT DOCUMENTS

| | | |
|---|---|---|
| 6,164,415 A | 12/2000 | Takeuchi |
| 6,241,450 B1 | 6/2001 | Gehman |
| 6,745,422 B1 | 6/2004 | Emerson |
| 6,898,815 B2 | 5/2005 | Young et al. |
| 6,931,686 B2 | 8/2005 | Hoofard et al. |
| 7,013,519 B2 | 3/2006 | Gleason |
| 7,062,813 B2 | 6/2006 | Hoofard et al. |
| 7,069,611 B2 | 7/2006 | Larson |
| 7,216,392 B2 | 5/2007 | Hoofard et al. |
| 7,310,843 B1 | 12/2007 | Mitchell |
| 8,832,890 B2 | 9/2014 | Loftis et al. |
| 2002/0170785 A1 | 11/2002 | Stockmann |
| 2002/0192061 A1 | 12/2002 | Brehmer et al. |
| 2004/0250360 A1 | 12/2004 | Young et al. |
| 2006/0081756 A1 | 4/2006 | Hallett |
| 2006/0082079 A1 | 4/2006 | Eichhorn et al. |
| 2007/0025831 A1 | 2/2007 | Burt et al. |
| 2009/0236578 A1 | 9/2009 | Nirenberg et al. |
| 2009/0300860 A1 | 12/2009 | Campbell |
| 2012/0048653 A1 | 3/2012 | Matthews et al. |
| 2012/0121369 A1 | 5/2012 | Ablabutyan |
| 2012/0237331 A1 | 9/2012 | Gabrielson |
| 2013/0092890 A1 | 4/2013 | Alanko |
| 2013/0198978 A1 | 8/2013 | Pohlman et al. |
| 2014/0109944 A1 | 4/2014 | Triolo |
| 2015/0197220 A1 | 7/2015 | Lusty et al. |
| 2016/0311376 A1* | 10/2016 | Dokter .............. B60R 3/005 |

FOREIGN PATENT DOCUMENTS

| | | |
|---|---|---|
| DE | 196 30 359 | 1/1998 |
| FR | 2 547 566 | 12/1984 |
| FR | 2 777 342 | 10/1999 |

OTHER PUBLICATIONS

English language machine translation of Abstract, DE 19 46 083, Klink, Mar. 18, 1971.

English language machine translation of Abstract, DE 196 30 359, Blomenroehr Fahrzeugbau GmbH, Jan. 29, 1998.

English language machine translation of Abstract, FR 2 547 566, Crepin, Dec. 21, 1984.

English language machine translation of Abstract, FR 2 777 342, Philippeau, Oct. 15, 1999.

Amitengineering. Movable Dock Ramp. YouTube, published on Nov. 2, 2012; Retrieved form the Internet on May 9, 2014, URL: http://www.youtube.com/watch?v=NPPd90-8a1g.

Leumengineering. Mobile Loading Dock—How It Works. YouTube, published on Jun. 14, 2013; Retrieved from the Internet on May 9, 2014, URL: https://www.youtube.com/watch?v=kyvwWLhSQqo.

* cited by examiner

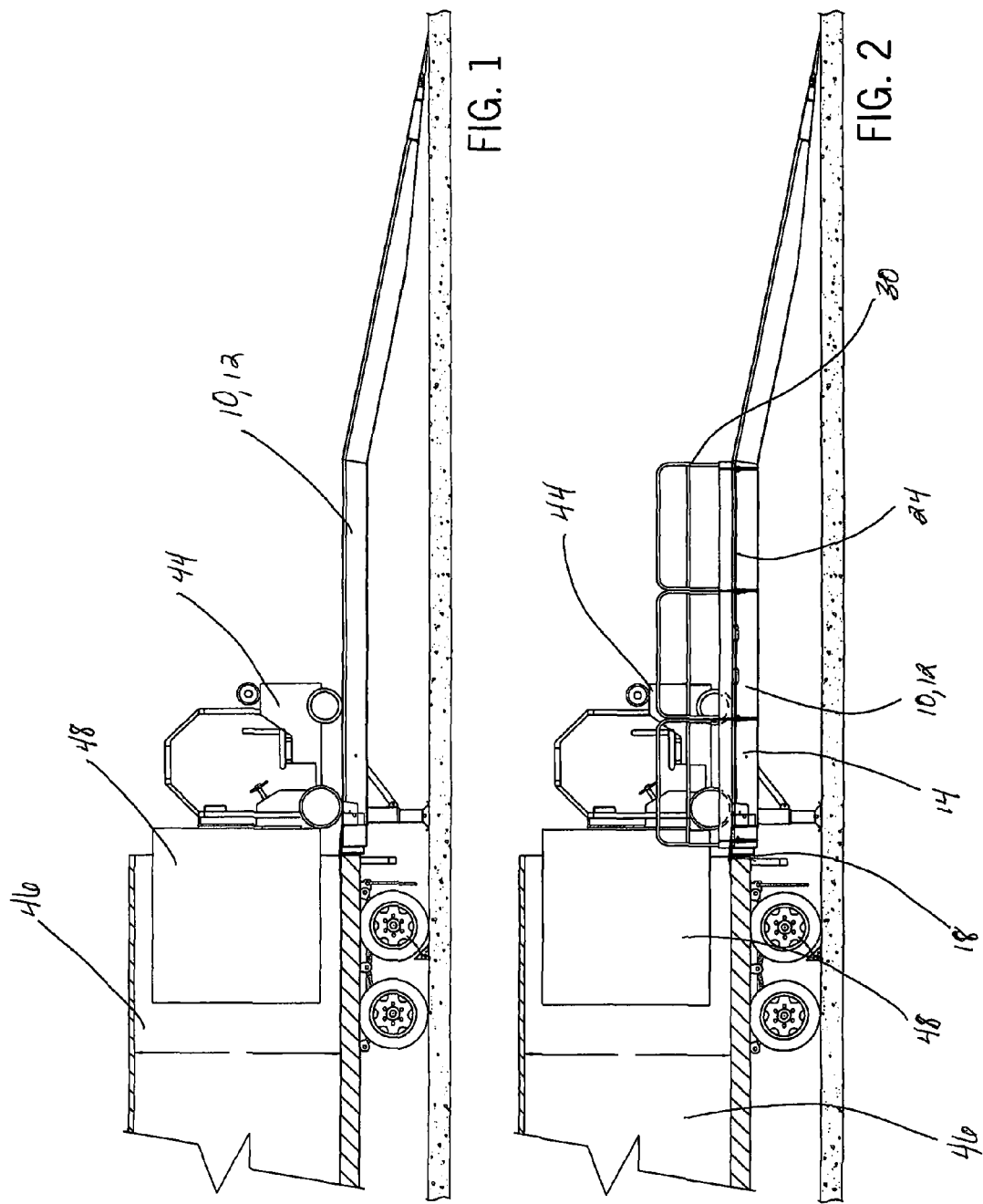

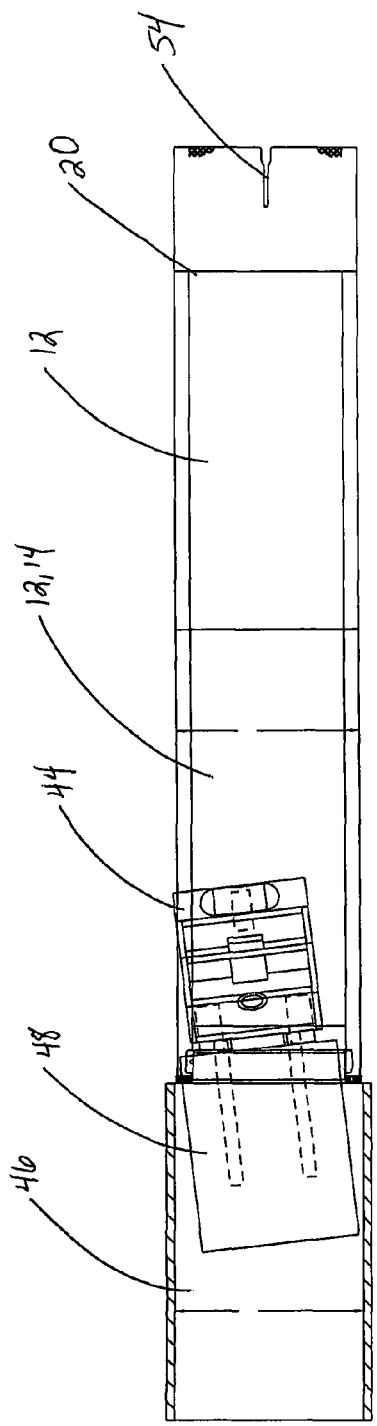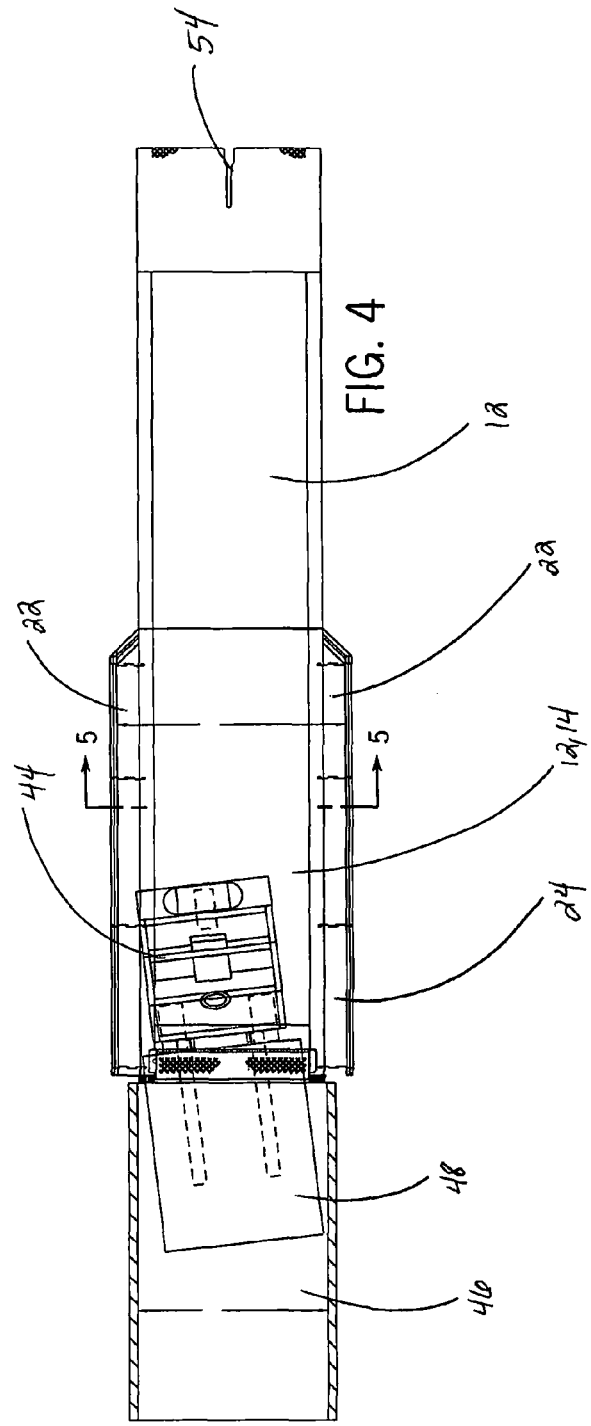

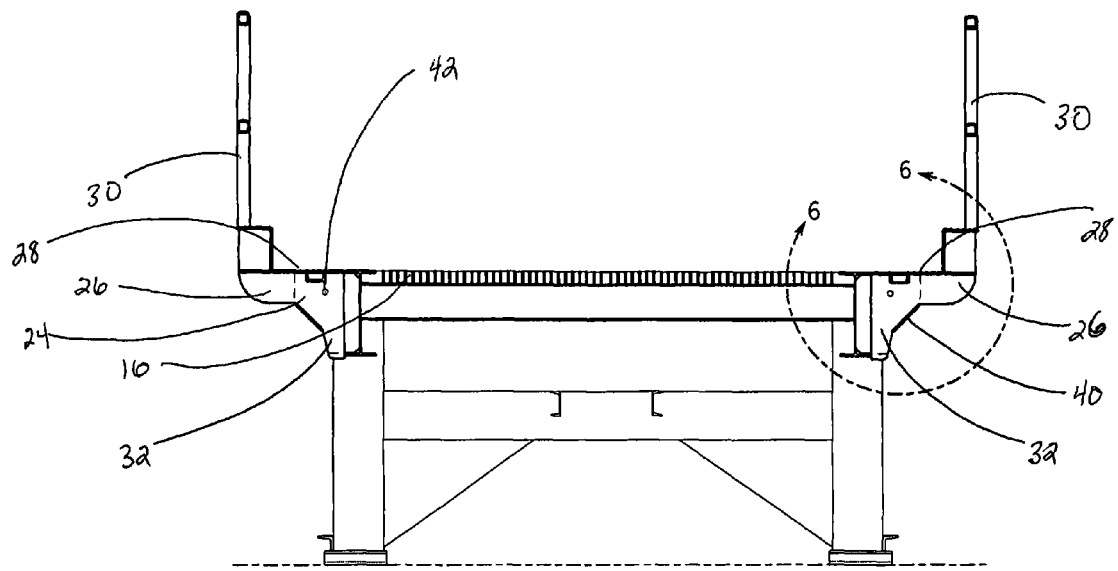
FIG. 5
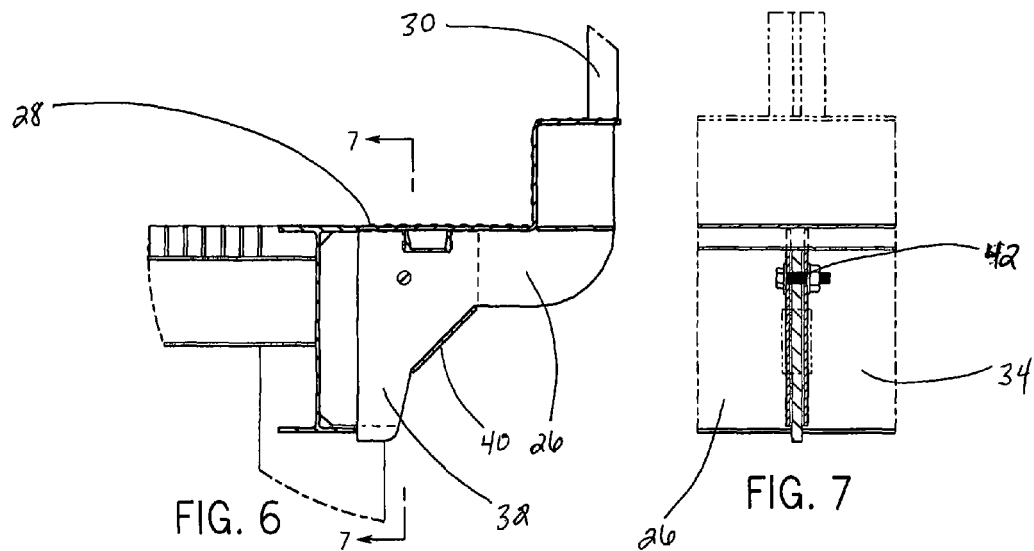
FIG. 6
FIG. 7

MOBILE LOADING DOCK WITH SIDE EXTENSIONS

FIELD

This device relates to mobile loading docks and more particularly to a loading dock with side extensions for easier loading and unloading of large products.

BACKGROUND

A variety of loading docks have been devised to adjust to the height of different trailers to properly match the height of the dock to the deck of the trailer. By aligning the height of the trailer and the dock the loading and unloading of cargo is facilitated.

There are many such devices in the prior art. One such device is seen in U.S. Pat. No. 4,624,446 to Gould which discloses a reinforced platform pivotally mounted to the ground at one end and includes a support assembly having hydraulic cylinders. In operation the rear wheels of a truck trailer are backed onto the platform and then the non-mounted end of the platform is lifted by the hydraulic cylinders until the deck of the trailer is equal to the height of the dock. A similar device is disclosed in U.S. Pat. No. 4,765,792 to Cherry et al. which also discloses a pivotally-mounted and hydraulically-raised platform.

Loading docks of the prior art typically have certain disadvantages. Most moveable loading docks are not very wide and this can pose problems when loading very large containers onto flatbed trucks or trailers. One problem is that if a trailer isn't backed up and aligned very closely and accurately with a loading dock, a fork truck or similar loading vehicle will have a difficult time loading containers into a tight space such as a trailer. Other moveable loading docks of the prior art which are wide are very difficult to ship because special Department of Transportation permits are required for shipping items over 102 inches wide.

It would be desirable to have a mobile loading dock which is secure and safe and which breaks down to under 102 inches wide for easy shipping yet when fully-assembled is large enough for fork trucks and similar vehicles to easily load product into trailers or onto flatbeds.

This device overcomes certain problems and shortcomings in the prior art, including those mentioned above and others, and provides advantages for a mobile loading dock not previously provided.

SUMMARY

This device is an improvement in a mobile loading dock apparatus of the type including a main member having a substantially flat upper ramp surface extending from an upper end for abutting the bed of a truck to a lower ground-adjacent end and opposed lateral edges. It is highly preferable that the lateral edges include a pair of removable side extension-barrier members each having a bracket removably secured with respect to one of the opposed lateral edges and having an upper flat surface substantially coplanar with and widening the flat upper ramp surface, and an upwardly-extending barrier portion offset from the upper ramp surface. Preferably, the upwardly-extending barrier portion is a handrail.

It is highly preferred that the bracket include an interlocking portion extending below the flat upper ramp surface for engagement with respect to the main member. Highly preferred embodiments include a bracket-engaging member along each of the opposed lateral edges and adapted to receive the interlocking portion. Preferably, the interlocking portion includes at least one protrusion and the bracket-engaging member includes at least one upwardly facing groove configured for engagement with the at least one protrusion.

It is also preferable that the bracket-engaging member is a unitary piece welded on each of the opposed lateral edges and including an angled guide plate to guide the side extension-barrier members into the bracket-engaging member. In some preferred embodiments, at least one securing bolt is used as a securement device for the bracket and bracket-engaging member In highly preferred embodiments, the side extension-barrier members are on the upper end of the ramp member. In other highly preferred embodiments, the side extension-barrier members extend along the entire length of the main member and are each a separate section nesting near or against a neighboring side extension-barrier member.

It is preferable that the ramp member include a first upper-end planar portion, the plane of which is parallel to a ground surface on which the ramp member rests; and a second planar portion, the plane of which is downwardly-angled from the upper end to the lower edge. Some embodiments also include a hand-rail secured to the first upper-end planar portion or along the length of the ramp.

Some embodiments include a wheel assembly on the ramp underside with a hydraulic check valve for automatic locking of the wheel assembly into a mobile position when the wheel assembly is erected. The wheel assembly also preferably includes a manually-actuated hydraulic release valve. Actuation of the release valve while in a mobile position causes the pushing force to be reduced and the wheel assembly to return to a resting position.

It is preferred that the wheel assembly also include an elongate weight-bearing support member having a first end attached to the ramp underside and a second end attached to a tension spring and having a foot. The foot contacts the ground surface when the wheel assembly is in the resting position. When in the resting position, the support member bears a portion of the weight of the ramp member.

It is highly preferred that the ramp member include two wheel assemblies, one on each side of the ramp. The wheel assemblies are equally distant from a point on the lower edge and are located on each side of ramp member to provide stability.

BRIEF DESCRIPTION OF THE DRAWINGS

The drawings illustrate a preferred embodiment including the above-noted characteristics and features of the device. The device will be readily understood from the descriptions and drawings. In the drawings:

FIG. 1 is a perspective view of the mobile loading dock with a fork truck unloading material from a trailer;

FIG. 2 is a perspective view of the mobile loading dock of FIG. 1 with side extensions;

FIG. 3 is a top view of the mobile loading dock of FIG. 1 without the side extensions;

FIG. 4 is a top view of the mobile loading dock of FIG. 1 with the side extensions;

FIG. 5 is a cross-sectional view of the mobile loading dock of FIG. 4 taken along line 5-5;

FIG. 6 is an enlarged view illustrating the detail of the bracket of FIG. 5 taken along line 6-6;

FIG. 7 is a cross-sectional view of the bracket of FIG. 6 taken along line 7-7;

DETAILED DESCRIPTION OF PREFERRED EMBODIMENTS

Figure 8:
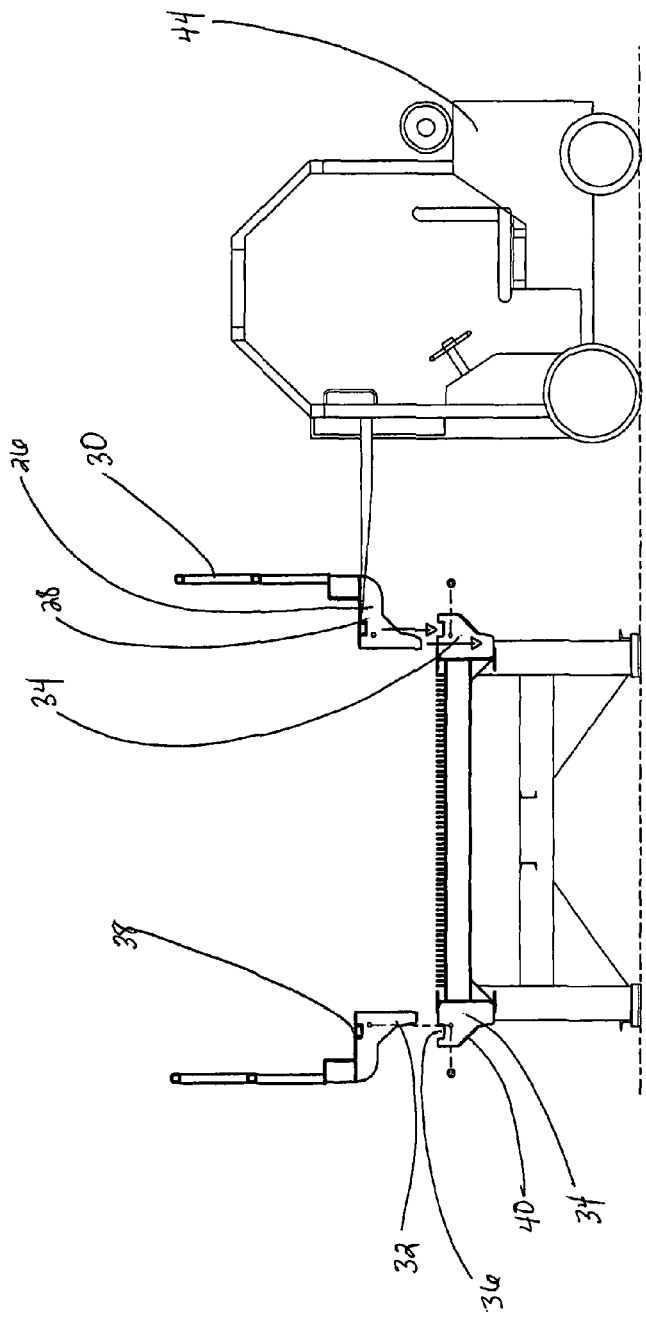
FIG. 8 is a perspective view of the mobile loading dock of FIG. 1 illustrating a fork truck lifting the side extensions into place.

FIGS. 1-11 illustrate a mobile loading dock (ramp) 10 with a main member 12 having a substantially flat upper ramp 14 surface extending from an upper end 16 for abutting a truckbed 18 to a lower ground-adjacent end 20 and opposed lateral edges 22. Lateral edges 22 include a pair of removable side extension-barrier members 24 each having a bracket 26 removably secured with respect to one of the opposed lateral edges 22 and having an upper flat surface 28 substantially coplanar with and widening the flat upper ramp surface 28, and an upwardly-extending barrier portion 30 offset from upper ramp surface 28.

As seen in FIGS. 1-2, ramp 10 can be primarily used to unload cargo 48 from any type of vehicle including a semi tractor/trailer 48 (as seen in FIGS. 1-2) or a flatbed truck. Oftentimes if the vehicle carrying cargo doesn't back completely straight up to upper end 16 of ramp 10, it is very difficult for a fork truck 44 to unload cargo 48 as seen best in FIGS. 3-4. FIG. 3 illustrates this problem. Ramp 10 in FIG. 3 doesn't have side extensions 24 and cargo 48 cannot be unloaded. In FIG. 4, ramp 10 does have side extensions 24 which provide for additional space for fork truck 44 to maneuver when loading and unloading cargo 48. Side extensions 48 also include an upwardly-extending barrier portion 30 which is a handrail as seen best in FIG. 1.

Removal of side extensions 24 for shipping is important since the maximum width across currently allowed by the Department of Transportation by road and without special oversized load permits is 102 inches or less. Ramp 10 in some embodiments is 97 inches wide when side extensions 24 are removed. When side extensions 24 are placed onto each side of ramp 10, the upper ramp surface 14 for fork truck 44 to drive on is increased to at least 108 inches wide and in some embodiments even wider.

FIGS. 5-6 illustrate the details of bracket 26. Bracket 26 includes an interlocking portion 32 as well as an upper flat surface 28. Upper flat surface 28 is the surface that a fork truck 44 can drive on if necessary when loading and unloading cargo 48. Upper flat surface 28 can handle fork lift loads. A bracket-engaging member 34 is located along each of the opposed lateral edges 22 which is adapted to receive the interlocking portion 32 on bracket 26 as seen in FIGS. 5-6. As seen best in FIG. 6, interlocking portion 32 extends below flat upper ramp surface 28 for engagement with respect to main member 12.

FIG. 6 illustrates that interlocking portion 32 includes at least one protrusion 38 and bracket-engaging member 34 includes at least one upwardly facing groove 36 configured for engagement with the at least one protrusion 38.

Figure 9:
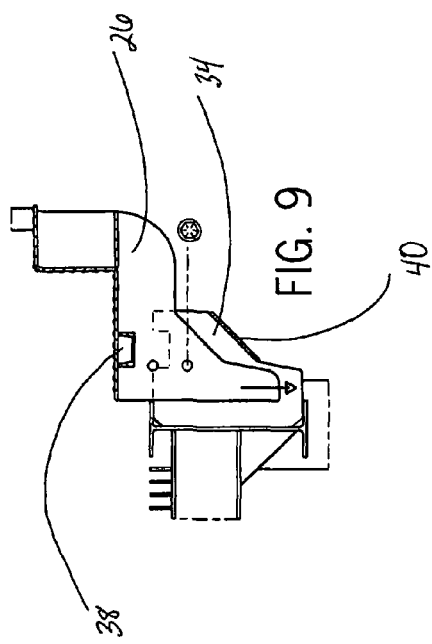
FIG. 9 is an enlarged view of the detail of the bracket and pivot access of FIG. 1.

Bracket-engaging member 34 in some embodiments is a unitary piece (although it can also be several pieces) welded on each of the opposed lateral edges 22 and including an angled guide plate 40 to guide side extension-barrier members 24 into the bracket-engaging member 34 this is seen best in FIGS. 6 and 9.

FIG. 7 shows that in some embodiments, at least one securing bolt 42 is used as a securement device to connect bracket 26 and bracket-engaging member 34. This acts a secondary securement method which helps keep bracket 26 and bracket-engaging member 34 in place. Bolt 42 is preferably a ¾" heavy bolt, however various sizes can be used.

FIGS. 8 and 9 illustrate the interaction between bracket 26 and bracket-engaging member 34. Bracket 26 is typically lifted into place by a fork truck 44 as seen in FIG. 8. Angled guide plate 40 helps to guide bracket 26 into bracket-engaging member 34. As seen in FIG. 9. When bracket 26 and bracket-engaging member 34 are in contact with one another, protrusion 38 rests within and in contact with groove 36. Interaction of protrusion 38 with groove 36 assists in resisting horizontal loads caused during impact on a curb. Both protrusion 38 and groove 36 extend the entire length of bracket 26 and bracket-engaging member 34.

Side extension-barrier members 24 can be located on upper end 16 of ramp member 10 as seen in FIG. 2 or in other embodiments side extension-barrier members 24 extend along the entire length of main member 10. (Each bracket 26 is about 4-5 feet apart when side extension-barrier members are placed in a row down ramp 10.) Each side extension-barrier member 24 is a separate section nesting near or against a neighboring side extension-barrier member 24 as seen by the location of the handrails 30 in FIG. 2.

Figure 10:
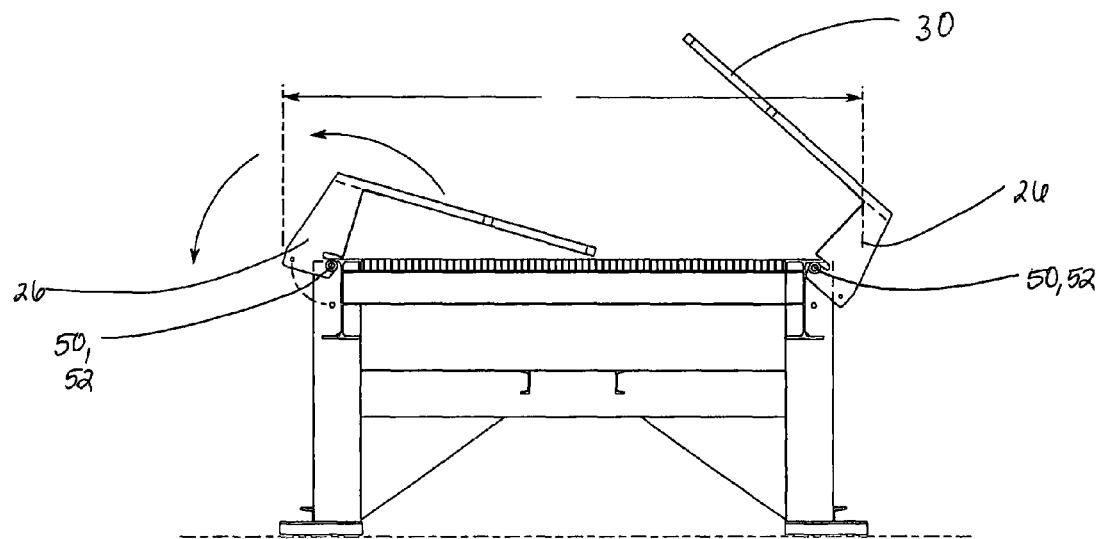
FIG. 10 is a front view of a second embodiment of the mobile loading dock illustrating side extensions partially collapsed.
Figure 11:
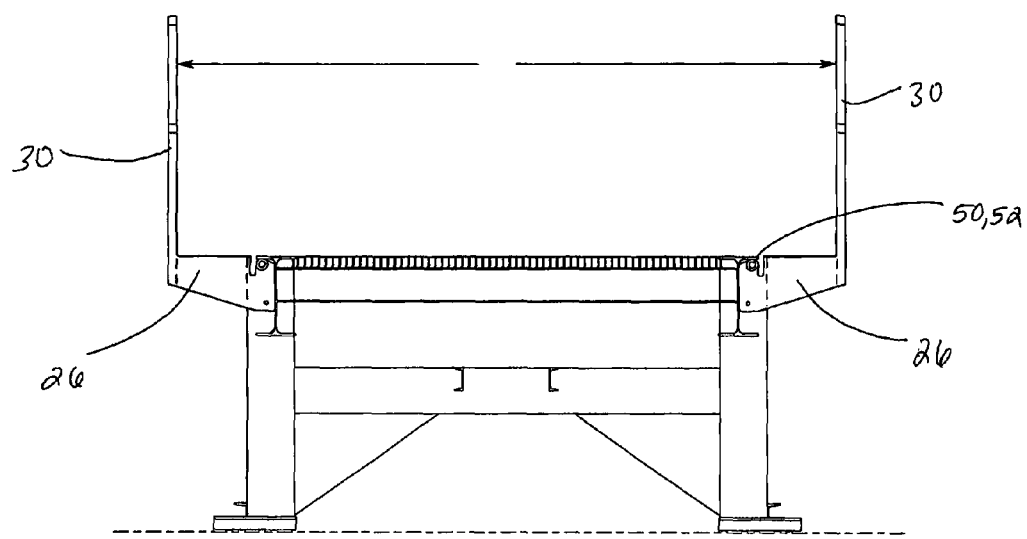
FIG. 11 is a front view of the mobile loading dock of FIG. 10 with the side extensions upright.

FIGS. 10-11 illustrate that some embodiments of ramp 10 include side extensions 24 with brackets 26 that are pivotal about a pivot access 50. Pivot access is a bolt 52 in some embodiments. Pivot access 50 allows barrier portions 30 and bracket to pivot so that an upper portion of barrier portions 30 rests against upper ramp surface 14 for transport or storage. FIG. 11 illustrates upper barrier portions 30 in the upright position whereas FIG. 10 illustrates that upper barrier portion 30 and bracket 26 can pivot.

In some embodiments, ramp 10 includes a first upper-end planar portion, the plane of which is parallel to a ground surface on which ramp 10 rests; and a second planar portion, the plane of which is downwardly-angled from upper end 16 to lower end 20.

Some embodiments include a wheel assembly (not shown) on the ramp underside with a hydraulic check valve for automatic locking of the wheel assembly into a mobile position when the wheel assembly is erected. The wheel assembly also preferably includes a manually-actuated hydraulic release valve. Actuation of the release valve while in a mobile position causes the pushing force to be reduced and the wheel assembly to return to a resting position.

It is preferred that the wheel assembly also include an elongate weight-bearing support member (not shown) having a first end attached to the ramp underside and a second end attached to a tension spring and having a foot. The foot contacts the ground surface when the wheel assembly is in the resting position. When in the resting position, the support member bears a portion of the weight of the ramp member.

It is highly preferred that the ramp member include two wheel assemblies (not shown), one on each side of the ramp. The wheel assemblies are equally distant from a point on the lower edge and are located on each side of ramp member to provide stability In other embodiments, ramp 10 includes a lower end 20 with a slot 54 as seen in FIGS. 3-4, slot is substantially parallel to the length of the ramp member for engagement with a slot-engaging member (not shown). Slot-engaging member is able to be connected to a fork truck 44 for positioning of ramp 10.

A wide variety of materials are available for the various parts discussed and illustrated herein. Although the device has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. In a mobile loading ramp including a main member having (a) a substantially flat upper ramp surface extending from an upper end for abutting a truckbed to a lower ground-adjacent end and (b) opposed lateral edges, the improvement comprising a pair of (c) pivotable side extension-barrier members each including (i) a bracket removably secured with respect to one of the opposed lateral edges and having an upper flat surface substantially coplanar with and widening the flat upper ramp surface, when in a deployed state, and (ii) an upwardly-extending barrier portion offset from the upper ramp surface whereby each side extension barrier member is pivotable for easy storage and transport of the mobile loading dock.

2. The ramp of claim 1 wherein the bracket includes an interlocking portion extending below the flat upper ramp surface for engagement with respect to the main member.

3. The ramp of claim 2 further including a bracket-engaging member along each of the opposed lateral edges and adapted to receive the interlocking portion.

4. The ramp of claim 3 wherein the interlocking portion includes at least one protrusion and the bracket-engaging member includes at least one upwardly facing groove configured for engagement with the at least one protrusion.

5. The loading dock of claim 1 wherein the side extension-barrier members are on the upper end of the main member, and the upwardly-extending barrier portion is a handrail.

6. The loading dock of claim 1 wherein the side extension-barrier members extend along the entire length of the main member and are each a separate section nesting near or against a neighboring side extension-barrier member.

7. The loading dock of claim 3 wherein the bracket-engaging member is a unitary piece welded on each of the opposed lateral edges and including an angled guide plate to guide the side extension-barrier members into the bracket-engaging member.

8. The loading dock of claim 3 further including at least one securing bolt as a securement device for the bracket and bracket-engaging member.

9. A mobile loading ramp comprising a main member having (a) a substantially flat upper ramp surface extending from an upper end for abutting a truckbed to a lower ground-adjacent end and (b) opposed lateral edges, the ramp including a pair of removable side extension-barrier members each having (i) a bracket removably secured with respect to one of the opposed lateral edges and having an upper flat surface substantially coplanar with and widening the flat upper ramp surface, and (ii) an upwardly-extending barrier portion offset from the upper ramp surface, whereby each side extension is pivotable about a pivot axis for easy storage and transport of the mobile loading dock.

10. The loading dock of claim 9 wherein the pivot axis is a bolt.

11. The ramp of claim 9 wherein the bracket includes an interlocking portion extending below the flat upper ramp surface for engagement with respect to the main member.

12. The ramp of claim 11 further including a bracket-engaging member along each of the opposed lateral edges and adapted to receive the interlocking portion.

13. The ramp of claim 12 wherein the interlocking portion includes at least one protrusion and the bracket-engaging member includes at least one upwardly facing groove configured for engagement with the at least one protrusion.

14. The loading dock of claim 9 wherein the side extension-barrier members are on the upper end of the main member.

15. The loading dock of claim 9 wherein the side extension-barrier members extend along the entire length of the main member and are each a separate section nesting near or against a neighboring side extension-barrier member.

16. The loading dock of claim 12 wherein the bracket-engaging member is a unitary piece welded on each of the opposed lateral edges and including an angled guide plate to guide the side extension-barrier members into the bracket-engaging member.

17. The loading dock of claim 12 further including at least one securing bolt as a securement device for the bracket and bracket-engaging member.

18. The loading dock of claim 9 wherein the bracket and a handrail are a unitary piece.

19. The mobile loading dock of claim 9 wherein the ramp member includes (a) a first upper-end planar portion, the plane of which is parallel to a ground surface on which the ramp member rests; and (b) a second planar portion, the plane of which is downwardly-angled from the upper end to the lower edge.

* * * * *